United States Patent [19]
Lind

[11] 3,761,642
[45] Sept. 25, 1973

[54] TOUCH-CALLING TONE GENERATOR

[75] Inventor: Paul U. Lind, Lombard, Ill.

[73] Assignee: GTE Automatic Electric Laboratories Incorporated, Northlake, Ill.

[22] Filed: Feb. 11, 1972

[21] Appl. No.: 225,440

[52] U.S. Cl. .............................................. 179/90 K
[51] Int. Cl. .............................................. H04m 1/51
[58] Field of Search ...................... 179/90 B, 90 BD, 179/90 R, 90 K

[56] References Cited

UNITED STATES PATENTS

| | | | |
|---|---|---|---|
| 3,612,773 | 10/1972 | Riehm, Jr. | 179/90 K |
| 3,424,870 | 1/1969 | Breeden et al. | 179/90 K |
| 3,521,005 | 7/1970 | Dow et al. | 179/90 K |
| 3,617,646 | 2/1971 | Knollman | 179/90 K |

*Primary Examiner*—Kathleen H. Claffy
*Assistant Examiner*—Kenneth Richardson
*Attorney*—K. Mullerheim et al.

[57] ABSTRACT

A pushbutton operated calling device usable in telephone subscriber's instruments. Intended for implementation with integrated circuitry, the use of varistors and thermistors are eliminated while still providing stable operation over a wide range of temperatures. Mechanical components are limited to a single make switch contact associated with each pushbutton.

12 Claims, 1 Drawing Figure

PATENTED SEP 25 1973 3,761,642
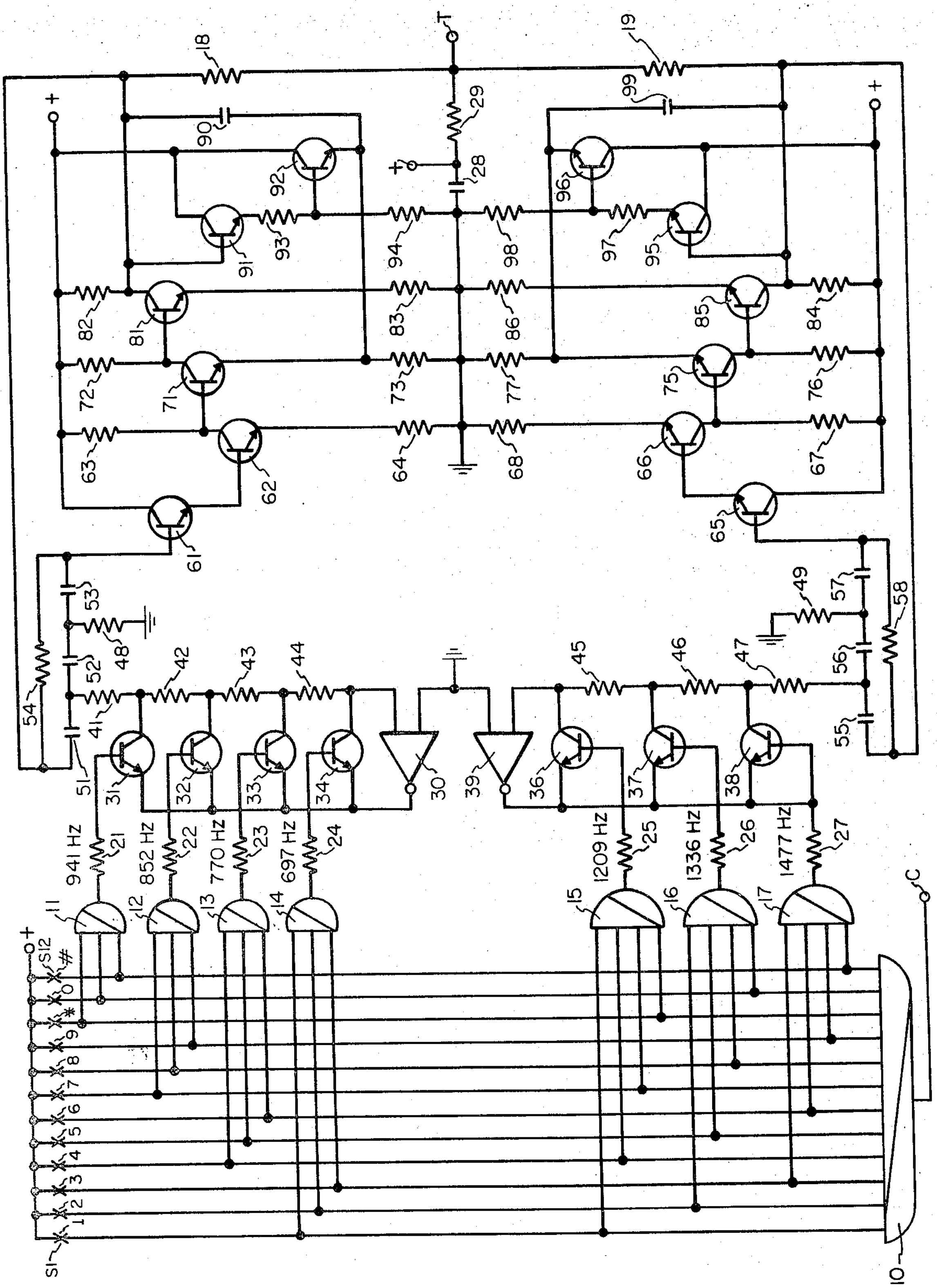

TOUCH-CALLING TONE GENERATOR

BACKGROUND OF THE INVENTION

1. Field of the Invention

This invention relates to telephone instrument calling devices and more particularly to a pushbutton operated calling device.

2. Description of the Prior Art

The use of pushbutton calling devices associated with telephone subscribers' instruments equipped for operation in automatic telephone systems is well known. Some of the earliest versions of this signaling technique were utilized even prior to the development of the conventional dial now long used for controlling switching paths in the telephone network.

Most recently it has become conventional to equip telephone subscribers' instruments for touch-calling service with oscillator circuitry capable of producing on a selective basis two tone signals simultaneously in response to a single operation of one of a group of included pushbuttons. Each tone pair generated is recognizable by the telephone central office as representative of a single selected digit. Tone oscillators usable in this arrangement have been disclosed in U.S. Pat. No. 3,184,554 issued May 18, 1965 to L. A. Meacham and F. West and in U.S. Pat. No. 3,284,577 which issued on Nov. 8, 1966 to R. V. Burns and R. T. Cleary. In the arrangements described in these patents, generation of tone signals was effected by transistor oscillators employing LC circuitry with portions of the frequency determining elements in the feedback circuits selectively switched into and out of the circuit by means of operation of the pushbutton to obtain the desired frequency combinations.

Two particular disadvantages of this form of circuitry were the requirement for inclusion of a common switch and the need for more than one frequency selection switch contact associated with the pushbutton. Frequency selection was accomplished by including two contacts per pushbutton or the utilization of mechanical coding linkages. The common switch function was accomplished by mechanically coupling all pushbuttons to a single switch, or by adding switch contacts to each pushbutton. Such methods of code selection and common switch operation were costly to implement from a mechanical viewpoint. Likewise the reliability of such arrangements has also been a problem.

In many touch-calling telephone units level control of the oscillators was accomplished by means of the inclusion of a varistor. Inasmuch as the silicon diodes forming a varistor are temperature sensitive, their utilization required compensating thermistors in the output portion of the oscillator. Obviously the inclusion of these devices while not only adding to the cost of the circuitry, prohibited its ready implementation by integrated circuit techniques.

Accordingly, it is the object of the present invention to provide a pushbutton operated calling device for use in telephone subscribers' instruments, that is readily implemented with integrated circuitry and eliminates the utilization of varistors and thermistors. By means of the included circuit, mechanical components of the present device are limited to the inclusion of a single make switch contact associated with each pushbutton.

SUMMARY OF THE INVENTION

The present invention is a pushbutton operated calling device for use with telephone subscribers' instruments employing electronic circuitry readily implemented by the use of integrated circuit techniques. The present invention is particularly suitable for use with active gain telephone circuit described in the copending application of R. H. Beeman et al, Ser. No. 209,047 filed on Dec. 17, 1971.

The circuit arrangement of the present invention utilizes a switching matrix for selection purposes operated in response to pushbuttons associated with the various digits to be selected. Outputs from the matrix are gated to a high tone generating circuit, a low tone generating circuit and to the voice circuitry of the associated telephone.

Both high and low tone generating circuits include an oscillator circuit having a feedback including a passive network. The passive network utilizes a "bridged double-T" notch network sometimes referred to as a bridged differentiator. This configuration is employed because electronic frequency switching is done most easily with respect to ground. Conventional twin-T networks do not lend themselves to this application since the notch depth of the typical twin-T configuration changes as a grounded leg is switched to change frequency. The included bridged network does not suffer from this deficiency. Gated outputs from the switching matrix are utilized to select one out of a group of transistors associated with each tone generating circuit and act as tone selection switches. These switches effectively insert a predetermined amount of resistance into one leg of the notch network to determine the appropriate operating frequency of the oscillator.

Also included in each tone generating circuit is a limiter circuit connected to the oscillator output and in turn controlling an intermediate stage of the oscillator to provide amplifier gain reduction. The limiter circuitry operates on a regenerative basis lowering the gain of intermediate and output stages of the oscillator circuitry during positive swings of the generated signal.

In the present arrangement temperature decreases have no effect on the limiter circuitry inasmuch as the limiting action of the limiter circuit occurs at a common point with respect to the bias point of the output of the amplifier. This is obvious when it is recognized that the output from the amplifier portion of the oscillator is also conducted through a feedback path that includes the notch network to the input of the oscillator circuitry. Thus the AC signal level is not temperature sensitive. Negative signal swings are automatically regulated due to the resonant properties of the notch network.

The output of the two tone generator circuits described above is utilized to drive the transmit amplifier of an associated telephone making the combining of the two touch-calling tones generated a simple matter. In the present invention the two tones are summed by applying the output of two similar value resistors the common point between the two series resistances being connected to another resistor which in turn is connected to the telephone voice circuitry.

As noted previously, a portion of the switching matrix is connected to a gate circuit which is extended also to the telephone voice circuitry. The gating of these matrix signals is provided for switching of the associated telephone circuitry from voice to touch calling mode and muting of an associated receiver.

BRIEF DESCRIPTION OF THE DRAWINGS

The single sheet of drawings appended hereto is a schematic functional diagram of a pushbutton operated calling device for use with an associated telephone instrument.

DESCRIPTION OF A PREFERRED EMBODIMENT

Referring now to the accompanying drawing a schematic circuit diagram of a touch-calling unit embodying the principles of the present invention is shown. As shown in the drawing the present touch calling unit consists of a selection matrix and two similar circuit sections one associated with generation of a group of high tones and the other associated with the generation of a group of low tones. Each generator circuit section includes a frequency switch amplifier, an oscillator-amplifier, a notch filter and a limiter circuit. In addition circuitry for combining the output from the two circuit sections is also included. The touch-calling selection matrix includes twelve keys designated S1 through S12. (Designations S2 through S11 inclusive have not been shown for purposes of clarity.) These pushbuttons are associated with digits 1 through 9 inclusive, plus 0, and * and # signs. Each pushbutton when depressed applies a positive potential to three OR gates. One gate in the low tone group of gates that include gates 11, 12, 13 and 14, one gate in the high tone group that includes gates 15, 16 and 17 and gate 10 whose output is conducted to the voice circuit of a telephone of which the present touch-calling unit is a portion.

The gate receiving potential in the low group activates the tone generator associated with the low group to produce a first selected frequency; as does actuation of the gate in the high group act to operate the tone generator in the high group to produce a second selected frequency. Actuation of gate 10 acts to mute the transmitter and receiver of the associated voice circuitry as well as operating circuitry in the telephone that connect the combined output of both of the present tone generator circuits to a transmit amplifier included in the telephone voice circuitry, where it is in turn connected to the telephone line.

Each tone generator section includes a frequency switch amplifier such as 30 in the low group and 39 in the high group. Referring for a moment only to the low group tone generator circuitry associated with frequency switch amplifier 30 are transistors such as 31, 32, 33 and 34, each of which has its base connected to one of the gate circuits extending from the touch-calling selection matrix such as gates 11, 12, 13 and 14 respectively. Each of these transistors functions as a dual diode. When, for example, pushbutton S1 is operated gate 14 will conduct a signal through resistor 24 to the base of transistor 34. Current flow into the base of transistor 34 flows out the emitter of transistor 34 to the input of amplifier 30. Likewise current flows out the emitter of transistor 34 to the output of amplifier 30 which is a high gain inverting amplifier. In one constructed embodiment of the present invention this amplifier consisted of three d.c. coupled inverting stages. Resistor 24 acts as the output load for amplifier 30. In a similar manner when current is applied to the base of transistors 31, 32 or 33 they too act to provide operating current for amplifier 30. Likewise amplifier 39 associated with the high group of tones is similar to amplifier 30 and is empowered by operation of transistors 36, 37 or 38 through their respective associated gate circuitry.

Transistors 61, 62, 71 and 81 and their associated biasing resistors form the oscillator-amplifier included in low tone generating section. Likewise transistors 65, 66, 75 and 85 and their associated biasing resistors comprise the oscillator-amplifier for the high tone generating section.

Transistors 61 and 62 form a modified Darlington configuration inverter amplifier. Transistors 71 and 81 are each common emitter inverting amplifiers. The corresponding transistor circuitry of the high group is identical.

A limiter circuit consisting of transistors 91 and 92 is included in the low tone generating section, and transistors 95 and 96 perform a like function in the high tone generating section.

Connected to transistors 81 and 85 are feedback paths through RC networks which in turn are connected to transistor 61 in the low tone generating section and to transistor 65 in the high tone generating section. An output is also taken from transistor 81 through resistor 18 and from transistor 85 through resistor 19 where the two output signals are mixed at the junction of resistors 18 and 19 and connected to the output terminal T of the present device where signals are then connected to the associated transmit amplifier included in the telephone which the present touch-calling unit is a portion of.

As noted previously included in each of the oscillator-amplifier circuits there is a positive feedback path including an RC network. This RC network consisting of (in the low tone group) resistor 54, resistor 48, capacitors 51, 52, 53 and associated resistors 41 through 44 inclusive, forms a notch filter for operation of the amplifier circuitry in the oscillating mode at a selected frequency determined by operation of one of the transistors 31 through 34 inclusive. As may be observed when transistor 34 is operated a resistance leg consisting of resistors 41, 42, 43 and 44 is connected to the above described notch filter. However, when transistor 31 is conducting only resistor 41 is included.

This notch filter is what is sometimes referred to as a "bridged differentiator." In this arrangement by means of adjusting the value of the resistance included in one arm the frequency of the network may be varied, thus permitting selection of the appropriate operating frequencies for the oscillator circuitry. The operation of the bridged differentiator circuit is discussed in detail in a magazine article entitled "Tunable RC Null Networks" appearing in EEE magazine, October 1969, pages 70 through 74 inclusive.

Operation of the oscillator circuit in the high tone generating section is identical to that described above.

As noted previously transistors 91 and 92 and associated resistors 93 and 94 in combination comprise a limiter circuit for the high tone generator section of the present invention. Similarly transistors 95 and 96 and their associated biasing resistors perform a similar function in the low tone generating circuit section. In the limiter circuitry the ratio of resistor 93 to 94 determines that point at which the collector of transistor 91 begins limiting. The output of the amplifier is connected of course to the base of transistor 91. Limiting or amplifier gain reduction occurs only on positive half cycles when the collector voltage of transistor 81 swings positive with respect to its quiescent voltage. As may be noted the output of the limiter is taken from the emitter of transistor 92 and connected between the emitter of transistor 71 and resistor 73, thus controlling the conduction of transistor 71.

Capacitor 90 provides high frequency compensation to prevent parasitic oscillations of the present circuitry. In the high tone generating circuit section, capacitor 99 performs a similar function.

As noted previously output from each of the generating section is mixed at the junction of resistors 18 and 19. Here the two high level and high impedance signals are combined. Resistor 29 is connected to battery so that resistors 18 and 19 won't reduce the collector voltages of transistors 81 and 85 respectively. Capacitor 28 provides filtering to remove ripple from the positive battery supply. The active limiting provided by the limiter circuitry in the present invention would cause severe harmonic distortion were it not for the notched characteristics of the RC network described previously. These notch networks pass frequencies above resonance without phase inversion. Harmonics produced by the limiters therefore pass through the notch networks and are reduced by the high inverting gain of the oscillating amplifiers. In at least one constructed embodiment of the present invention the notch networks had a nominal notch attenuation of 35 DB. The signal is inverted in the notch networks at resonance.

A more thorough understanding of the operation of the present invention may be had by reference to the following description wherein the generation of the two tones 697 Hz and 1,209 Hz conventionally associated with the digit 1, will be described.

Initially a subscriber would operate switch S1 which is normally of the pushbutton type. Operation of switch S1 will apply a positive potential to OR gates 14, 15 and 10. At gate 14 the potential will be conducted to the base of transistor 34 through resistor 24. Transistor 34 is rendered conductive providing an effective a.c. ground at its collector to the four resistors (41–44 inclusive) that comprise the frequency selection leg of the notch network.

Because of the notch network which is connected in the positive feedback path of the amplifier consisting of transistors 61, 62, 71 and 81, the amplifier will oscillate at the frequency (697 Hz) selected. Output signals are taken from the collector of transistor 81 and applied through resistor 18 to output terminal T.

The amplitude of the output is controlled by the limiter circuit consisting of transistors 91 and 92, output from transistor 81 being connected to the base of transistor 91 and output from transistor 92 being connected to the emitter of transistor 71, to control its conduction.

In like manner potential extended in the matrix to gate 15 is then conducted to the base of transistor 36 causing it to operate in a manner similar to that described in connection with transistor 34 above. By virtue of its shunting action the three resistors 45, 46 and 47 are included in the frequency determining leg of the notch network associated with the low tone generating section.

In the same manner as described above transistors 65, 66, 75 and 85 comprise an amplifier whose output is taken through a positive feedback network to input transistor 65 causing oscillation at the selected frequency of 1,209 Hz. Here the output signal is taken from transistor 84 and conducted through resistor 19 to output terminal T where it is combined with the 679 Hz signal taken from the low tone generating section. Transistors 95 and 96 provide limiting action in the same manner as transistors 91 and 92 perform this function for the low tone group. Potential extended through gate 10 to terminal C is connected to the associated telephone circuitry for control purposes as previously described.

What is claimed is:

1. A calling device circuit comprising: a selection matrix including a plurality of gated outputs, and a plurality of inputs each connected to individual actuating means; at least a first oscillatory signaling generator comprising an amplifier including input and output stages, and a positive feedback path including a bridged differentiator notch network connected between the output of said output stage and the input of said input stage, said network including at least one leg comprising a plurality of series connected resistive elements; and switching means connected between a portion of said plurality of gated outputs and said network leg, operated in response to operation of one of said actuating means, to selectively provide an alternating current shunt path to a predetermined portion of said resistive elements, thereby determining the frequency of operation of said signal generator.

2. A calling device circuit as claimed in claim 1 wherein: said signaling generator amplifier further includes at least one intermediate stage connected between said input and output stages.

3. A calling device circuit as claimed in claim 2 wherein: said signal generator further includes a limiter circuit comprising a negative feedback network connected between the output of said output stage and the input of said intermediate stage.

4. A calling device circuit as claimed in claim 3 wherein: said limiter circuit includes means for controlling the level of limiting applied by said negative feedback network.

5. A calling device circuit as claimed in claim 4 wherein: said means for controlling the level of limiting comprises a resistive divider having first and second resistive elements connected in series relation, the ratio of the resisted magnitudes of said resistors being determinative of the magnitude of negative feedback applied by said network.

6. A calling device circuit as claimed in claim 1 wherein: said bridged differentiator notch network included in said feedback path comprises first, second and third capacitive elements connected in series, said one leg comprising a plurality of series connected resistive elements connected at one end to said first and second capacitive elements, a second leg comprising at least one resistive element connected at one end to said second and third capacitive elements, said first capacitive element connected to the output of said amplifier and said third capacitive element connected to the input of said amplifier, and another resistive element connected between the output of said amplifier and the input of said amplifier.

7. A calling device circuit as claimed in claim 1 wherein: one of said gated outputs is connectable to circuitry external to said calling device circuit, providing operating potential to said external circuitry in response to operation of any one of said individual actuating means.

8. A calling device circuit as claimed in claim 1 wherein: is further included at least a second signal generator comprising the same construction as said first signal generator; said switching means operated in response to operation of one of said actuating means to selectively provide an alternating current shunt path to a predetermined portion of said resistive elements included in the frequency determining networks of each of said signal generators, thereby determining the frequencies of operation of each of said signal generators.

9. A calling device circuit as claimed in claim 8 wherein is further included: signal combining means connected to the output stage of said amplifiers included in said first and second signal generators, to provide combined output signals from said calling device circuit to an external circuit.

10. A calling device circuit as claimed in claim 9 wherein: said signal combining means comprise a first resistive element connected between the output stage of said first signal generator amplifier and an output terminal; and a second resistive element connected between the output of said second signal generator amplifier output stage and said output terminal.

11. A calling device circuit as claimed in claim 1 wherein: said switching means comprise a plurality of switching devices, each of said switching devices including a circuit connection to one of said selection matrix gated outputs, and a circuit connection to said resistive element network leg.

12. A calling device circuit as claimed in claim 11 wherein: said switching means further include an amplifier including output circuit connections to each of said switching devices and an input circuit connection to each of said switching devices, said input circuit connections from a portion of said switching devices including at least one of said network leg resistive elements.

* * * * *